United States Patent [19]
Jensen

[11] 3,767,217
[45] Oct. 23, 1973

[54] VARIABLE CHUCK
[75] Inventor: Howard Martin Jensen, Huntington, N.Y.
[73] Assignee: Ritmar Corporation, Huntington, N.Y.
[22] Filed: Apr. 16, 1971
[21] Appl. No.: 134,668

[52] U.S. Cl. .................................. 279/56, 279/70
[51] Int. Cl. ............................................ B23b 31/12
[58] Field of Search ................... 279/61, 64, 69, 70, 279/60, 47, 48, 56, 51, 52, 1 DC

[56] References Cited
UNITED STATES PATENTS
1,606,972  11/1926  Nielsen ................................ 279/69
1,857,012  5/1932  Corley ................................. 279/56
1,651,087  11/1927  Ellrich ................................. 279/56

FOREIGN PATENTS OR APPLICATIONS
531,919  8/1931  Germany ............................. 279/56

Primary Examiner—Gil Weidenfeld
Attorney—Bucknam & Archer

[57] ABSTRACT

The invention provides a work chuck which by a single rotary motion may be adjusted to hold in work position any one of a range of different sized tools of a type having a shank portion and a drive portion by which it may be engaged by chuck jaws.

6 Claims, 5 Drawing Figures

Patented Oct. 23, 1973

3,767,217

Howard Martin Jensen INVENTOR.

BY Bucknam and Archer
ATTORNEYS

VARIABLE CHUCK

SUMMARY OF THE INVENTION:

The present invention pertains to an adjustable work chuck for receiving any one of a series of multi-sized tools of the type having a shank portion and a driving portion of different size from said shank portion. More particularly, it pertains to a chuck adapted to be engaged by the arbor or spindle of a rotary machine such as a drill or tapping machine and to hold selectively in work position any one of a series of drills or taps of varying sizes.

Many years ago, it was conceived that, by a single rotary motion, a chuck could be adjusted so that drive jaws and shank jaws, moving at the same speed, would accommodate themselves either to a drill having a shank of uniform diameter or to a drill with a square tang at the butt end.

As the problem of designing a variable chuck for receiving a range of sizes of drills or taps became pressing, the approach as illustrated, for example, by U.S. Pat. No. 2,931,660 has been to resort to the use of two separate adjusting movements, one for the shank jaws and another for the drive jaws.

It has now been found that, by returning to the earlier approach but departing from the concept of moving the drive jaws and the shank jaws at the same speed, it is possible to provide a variable chuck requiring but a single adjustment motion and capable of receiving any one of a full range of tools and holding it firmly and properly in operating position, while preserving overall chuck dimensions commensurate with limits set by conventional operating conditions.

A special advantage of the new design is that, while it permits proper engagement of each of the tools of the type having both a shank portion and a drive portion, it is also completely effective for receiving a similar range of tools having shank portions but no drive portions. In such uses, as for example with drills, the shank only will be engaged by the shank jaws, the drive jaws being out of engagement with the tool.

DRAWINGS

In order that the disclosure will be more fully understood and readily carried into effect, the following detailed description is given with reference to the accompanying drawings in which.

SPECIFIC DISCLOSURE

Figure 1:
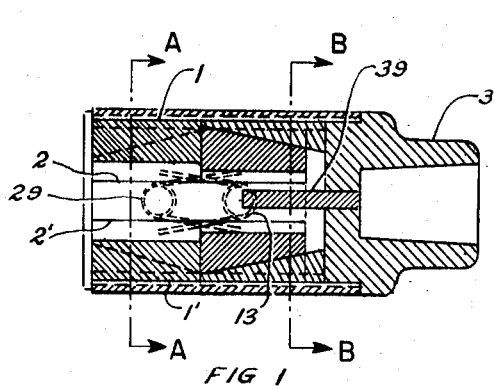
FIG. 1 is a longitudinal section of a variable tap chuck.
Figure 2:
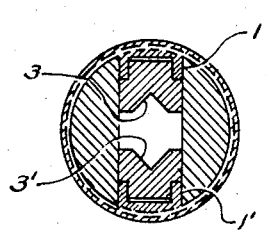
FIG. 2 is a section along the line A—A of FIG. 1.
Figure 3:
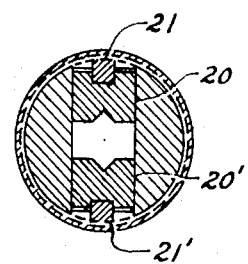
FIG. 3 is a section along the line B—B of FIG. 1.
Figure 5:
FIG. 5 shows a commercially available tap suitable for use with the invention.

Referring to FIG. 1 of the drawings, there is disclosed a variable tap chuck incorporating the features of the present invention. As seen in this figure a pair of shank actuators 1 and 1' engage respective shank jaws 2 and 2' for the purpose of bringing shank engaging V-surfaces 3 and 3' on each jaw into engagement with the surface of a shank 4 of a tap such as shown in FIG. 5.

The interaction between a shank actuator 1 or 1' and its corresponding shank jaw 2 or 2' is achieved by providing complementary surfaces 5a and 5b or 5a' and 5b'. These surfaces are preferably planes. A threaded outer portion 6 or 6' of the shank actuator 1 or 1' is engaged by mating internal threads 7 of a adjustment drive member 8.

The shank jaw 2 or 2' has a cut away guide section 9 or 9' adapted to be received within a corresponding U-groove 10 or 10' in its respective shank actuator 1 or 1'. When thus positioned, the shank actuator and shank jaw, as an assembly, are adapted to fit within a guide space 11 in a jaw retainer 12.

Figure 4:
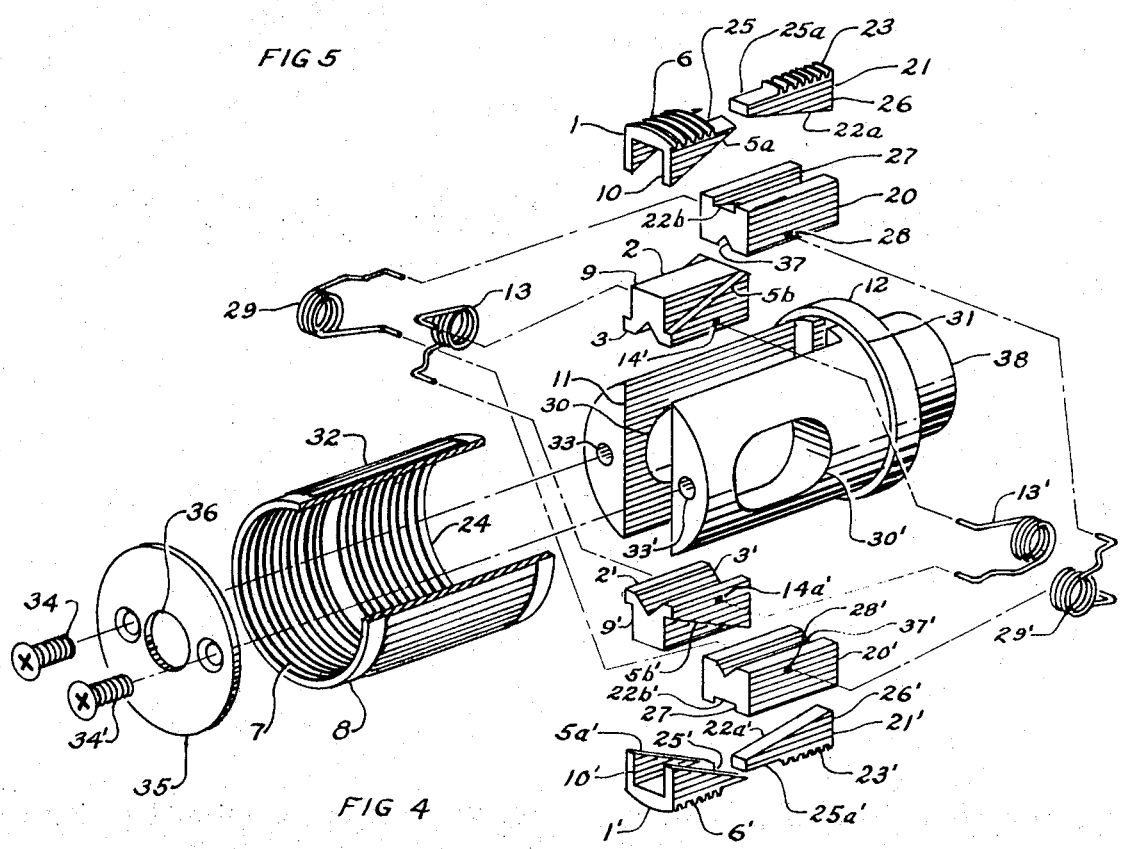
FIG. 4 is an exploded view.

As best seen in FIG. 1, the shank jaws 2 and 2' are biased outwardly by at least one shank jaw biasing member 13 which, as shown in FIG. 4, may be in the form of a torque spring. In the present embodiment, a second shank jaw biasing member 13' is also provided. Both shank jaws 2 and 2' have bias member receiving recesses therein. The recesses 14' and 14a' for receiving shank jaw biasing member 13' can be seen in FIG. 4. Similar recesses, not shown, are provided on the other sides of the respective shank jaws 2 and 2' for recieving shank jaw biasing member 13.

A similar assembly serves to actuate a pair of drive jaws 20 and 20' adapted to engage the driving square 15 of the typical commercial tap shown in FIG. 5. Thus, drive actuators 21 and 21' engage said respective drive jaws 20 and 20' through cooperating complementary surfaces 22a and 22b and 22a' and 22b'. In practice, the slopes of complementary surfaces 22a and 22b and 22a' and 22b' will differ from the slopes of complementary surfaces 5a and 5b and 5a' and 5b'. Thus, the shank jaws 2 and 2' will move inwardly at a rate different from the rate of inward movements of the drive jaws 20 and 20'. The advantage is that, for each of the series of tools to be received, a predetermined relative movement between the drive jaws and the shank jaws can be positively established, whereby for each tool a single adjustment movement brings each of the respective jaws into its proper tool-engaging position. The drive actuators 21 and 21' are each provided with threaded outer portions 23 and 23' adapted to engage a second threaded area 24 of said rotary drive member 8. The threads of area 24 are of opposite hand from the threads 7.

In the preferred embodiment of the invention, the shank actuators 1 and 1' are each provided with a recess 25 or 25' adapted to receive respective tongues 25a or 25a' of the drive actuators 21, 21'. It is preferable that the recesses 25 and 25' should extend in the longitudinal direction to a length sufficient to permit the tongue received therein to telescope with the shank actuator to the point where the threads 6 or 6' are in close proximity to the threads 23 or 23', the advantage being a decrease in the over-all length of the chuck. It will be appreciated that operating conditions generally severely limit tolerable overall dimensions of the chuck in commercial practice. On the other hand, the range of sizes of tools receivable by the chuck is directly dependent upon the axial lengths of the complementary surfaces. By constructing the actuators so that the tongues 25a and 25a' can extend into recesses 25 and 25' a substantial distance beyond the threaded outer portions 6 and 6', this range of axial-adjusting movement is materially increased.

As in the cases of the shank jaws and shank actuators, the drive actuators are provided with guide sections 26 and 26' which are adapted to be received by corresponding U-grooves 27 and 27' in the respective drive jaws 20 and 20'. Recesses 28' and 28a' are adapted to receive a drive jaw biasing member 29' similar to the member 13', and a second drive jaw biasing member 29 is adapted to engage recesses (not shown) on the opposite sides of the respective drive jaws.

Access openings 30 and 30' are provided in the jaw retainer 12 to facilitate assembly of the drive jaw biasing members 13, 13', 29 and 29'. The drive actuators and drive jaws fit as an assembly into the guide space as do the shank jaws and shank actuators.

A banking shoulder 31 on the jaw retainer 12 has an outer diameter corresponding to the outer diameter of rotary drive member 8, the outer surface of said drive member 8 having knurling 32. Threaded recesses 33 and 33' are provided in jaw retainer 12 for receiving screws 34 and 34' adapted to secure end plate 35 against jaw retainer 12 when the parts are assembled in operating position.

OPERATION

In operation, one inserts the driving square 15 of the tap through an opening 36 in end plate 35 to the position where said driving square 15 is engageable by V-surfaces 37 and 37' of drive jaws 20 and 20'. In this position, the shank 4 of the tap will be engageable by shank engaging V-surfaces 3 and 3'. Thereupon, by rotating the drive member 8 in the appropriate direction, the respective V-surfaces will bear against both the shank 4 and the sides of the driving square 15 to hold the tap firmly in operative position. The use of jaws with opposed pairs of V-surfaces has been found to be particularly effective for centering the tool and providing gripping contact therewith. To release the tap, the drive member 8 is rotated in reverse direction and the shank jaw biasing members 13 and 13' and the drive jaw biasing members 29 and 29' become operative to relieve the pressure of the jaws against the tap.

The mounting end 38 of the chuck opposite the end plate 35 may be of conventional shape for use in commercially available spindles or arbors. A stop pin 39 is provided on the mounting end 38 to limit the inward movement of the tool.

A typical variable chuck according to the invention can be designed, for example, to accommodate commerical taps varying in size from 0.194 inches shank outside diameter up to 0.500 inches shank outside diameter. Another tap range of conventional interest is 0.142 inches shank outside diameter up to 0.255 inches. Other limits can also be selected. It should be understood that the degree of adjustment of the motion of the shank jaws 2 and 2' as different size taps are introduced will be different from the degree of adjustment of the motion of the drive jaws 20 and 20'. It has been found that, for the specific range of tap sizes given above, suitable compensation for this variation will be achieved if the complementary surfaces 5a–5b and 5a'–5b' are constructed to lie at an angle of approximately 15° with the axis of the chuck and the complementary surfaces 22a–22b and 22a'–22b' are constructed to lie at an angle of approximately 10° with the axis of the chuck.

Referring to the threaded areas 7 and 24 of rotary drive member 8, it has been found that Acme thread configuration is particularly satisfactory.

What I claim is:

1. In an adjustable chuck for selectively receiving any one of a series of different size rotary work tools of a type having a shank portion and a differently constructed drive portion, the improvement which comprises a plurality of shank jaws for engaging the shank portion of the tool, a plurality of drive jaws for engaging the drive portion of the tool, an adjustable drive means rotatable to selectively position said shank jaws and drive jaws into and out of engagement with said shank portion and drive portion respectively, and actuator means responsive to said drive means and disposed to simultaneously move the shank jaws and drive jaws in accordance with the movement of the drive means to correspondingly engage and thereby grip the tool on both its shank and drive portions, and to release the tool, said actuator means including a plurality of shank jaw actuator parts and a plurality of drive jaw actuator parts, said shank jaw actuator parts having inclined surfaces cooperating with the shank jaws and being operable to translate the rotary movement of said adjustment drive means into linear movements of the shank jaws relative to one another, and said drive jaw actuator parts having inclined surfaces cooperating with the drive jaws and being operable to translate the rotary movement of said adjustment drive means into linear movements of the drive jaws relative to one another, said shank jaw actuator parts and said drive jaw actuator parts having inclined surfaces with different slopes to accomodate gripping the shank and drive portions of the tool independently and simultaneously with a given movement of the adjustment drive means.

2. The improvement according to claim 1 wherein said adjustment drive means has threads that engage matching threads on said shank jaw actuator parts and said drive jaw actuator parts.

3. The improvement according to claim 1 wherein said shank jaw actuator parts and said drive jaw actuator parts have telescoping portions and are disposed for relative axial movement.

4. The improvement according to claim 1 wherein said shank jaws include a pair of shank jaws disposed in diametrically opposite relation, and said drive jaws include a pair of jaws disposed in diametrically opposite relation.

5. The improvement according to claim 1 wherein each shank jaw actuator part is disposed in opposite relation to, and for opposite movement relative to a corresponding drive jaw actuator part.

6. The improvement according to claim 1 including means resiliently biasing said shank jaws and said drive jaws apart.

* * * * *